March 6, 1945.  A. S. WOLFNER  2,371,010
PREPARATION OF STABLE BINARY MOTOR FUEL
Filed July 29, 1941
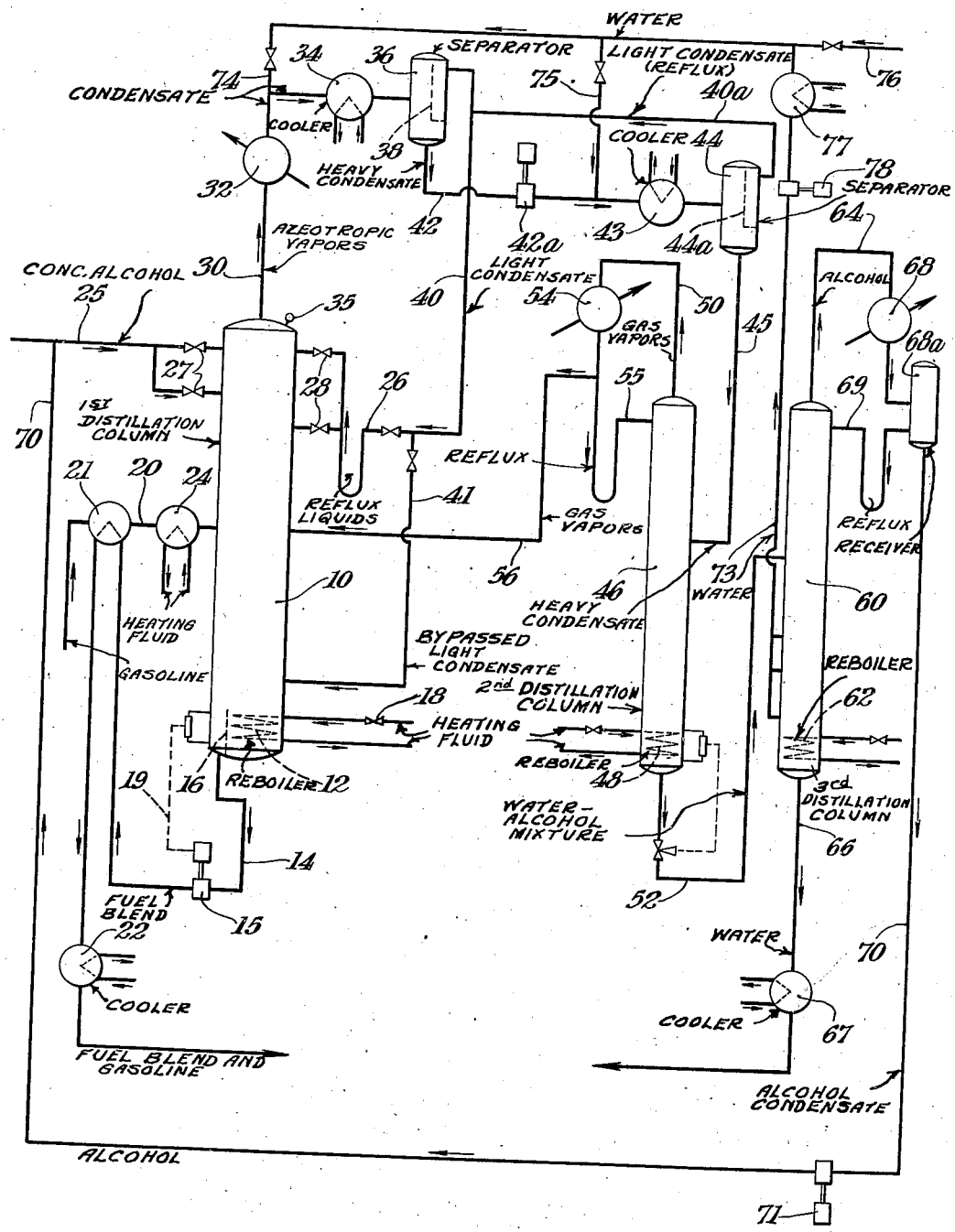
INVENTOR
Alfred S. Wolfner
BY Nathaniel Ely
ATTORNEY Patented Mar. 6, 1945

2,371,010

UNITED STATES PATENT OFFICE 2,371,010

PREPARATION OF STABLE BINARY MOTOR FUEL

Alfred S. Wolfner, Long Beach, N. Y.

Application July 29, 1941, Serial No. 404,529
In Mexico April 26, 1941

4 Claims. (Cl. 202—42).

The invention described herein relates to the production of a motor fuel composed of gasoline and ethyl alcohol and represents a simple method of preparation which improves considerably the working methods known up to now.

Blends of alcohol and motor gasoline have been the object of numerous economic and technical studies, and such blends have been made in various countries. The methods of blending which have been principally used heretofore are three:

1. Blending of motor gasoline with concentrated ethyl alcohol of maximum 95.4% strength containing at least 4.6% water.
2. Preparation of a ternary mixture by blending motor gasoline with concentrated alcohol of maximum 95.4% strength and with industrial benzol.
3. Blending of absolute alcohol with motor gasoline.

The blended motor fuel composed only of gasoline and concentrated alcohol does not give entire satisfaction because the miscibility of the two components is not complete. The miscibility is a function of the temperature, of the water content of the concentrated alcohol, and of the proportion in which the two components are blended. As a matter of fact, separation of the blend will take place when the temperature is lowered; and two layers of different gravity will form, an upper layer composed of gasoline containing a small percentage of alcohol which is practically anhydrous and a lower layer composed of the larger part of the alcohol originally incorporated into the motor fuel together with nearly all the water which the alcohol initially contained and a portion of the gasoline composed of its most volatile constituents. It is evident that the separation into two layers at low temperatures presents a serious inconvenience for the good operation of a motor car and that such a formula for blending alcohol and gasoline is not desirable.

When commercial benzol or any other similar material is added in considerable proportion to the blend of gasoline and 95% alcohol, a motor fuel is obtained that has a good stability. However, such a blend may be otherwise objectionable inasmuch as the benzol or other material to be added may not be generally available in sufficient quantity or at a price which would allow its use without a noticeable increase in the cost of the resulting motor fuel. The quantity of benzol to be added in order to obtain good stability at low temperatures of the blended motor fuel varies according to the climatic conditions and the concentration of the alcohol, but very often the quantity of benzol to be added is of the order of the quantity of concentrated alcohol incorporated into the motor fuel.

Absolute ethyl alcohol is a very strong organic solvent and is completely miscible with gasoline at any temperature and in any proportion. Commercial blends of motor gasoline and absolute alcohol form a motor fuel of perfect stability that has considerable value for the motorist because of the fact that alcohol, incorporated into gasoline in moderate proportions, will increase the anti-knock value of the gasoline and give other desirable characteristics thereto. The preparation of completely dehydrated alcohol to be added to motor gasoline has been solved technically, and industrial installations now exist for its production.

The purpose of the present invention is to avoid the difficulties of the known methods of preparing absolute alcohol which is to be blended with motor gasoline and to provide a process that permits the direct preparation of a stable motor fuel from the two components with a saving in production cost and the plant equipment required.

Normally, for the production of absolute alcohol, chemical or physical methods are used. The best known are the following:

In the chemical dehydration of alcohol, burnt lime or alkaline salts, the latter often suspended in glycerine, are used to remove the water. These methods, however, have not found important industrial application on account of the difficulties of regeneration of the dehydrating chemical and on account of the losses of alcohol incurred.

The physical process of dehydrating alcohol is based on azeotropic distillation. In an ideal blend of two liquids, the partial vapor pressure of each component is directly proportional to the molal concentration of each, and the total vapor pressure is equal to the sum of the partial vapor pressures. According to the laws of the ideal gases, the composition of the vapors formed during distillation is proportional to the partial vapor pressure of each component multiplied by its molal concentration in the liquid.

A deviation from these ideal laws of vaporization is observed when the two constituents blended do not belong to the same chemical group and exert a molecular interaction. The partial vapor pressures exerted by the blended product are no longer proportional to the concentration of its components; and their sum, the total vapor pressure, does not follow a straight line between the vapor pressures of the two pure products but has an intermediate maximum or minimum point. Such a maximum or minimum total vapor pressure corresponds to the distillation of an azeotropic mixture and represents the limit of concentration that can be obtained by fractional distillation.

For this reason, the rectification of aqueous alcohol at atmospheric pressure cannot give a product containing more than 95.4% by weight of alcohol. A third material must be added to the water-alcohol system in order to break the azeotrope. Under these conditions, a new form of vaporization equilibrium is obtained until one of the three constituents is eliminated. In the case of the distillation of absolute alcohol, the vapors liberated contain a greater proportion of water than the liquid, and the dehydration of the alcohol is thereby accomplished. It is then necessary to recover from the condensed vapors the material which has been used for the removal of the water. This material is also to be recovered from the distillation residue which otherwise would be a binary blend of dehydrated alcohol and the third material used for the removal of the water. A third material which may be utilized for the removal of the water comprises benzol, ether, trichlorethylene, and the like.

The known process of manufacturing absolute ethyl alcohol comprises the following phases:

(A) The concentration and rectification of aqueous alcohol to yield a concentrated alcohol of 95.4% strength as an overhead product and a residue consisting of water, from which practically all the alcohol has been removed.

(B) The azeotropic fractional distillation of the concentrated alcohol, to which a third material has been added for the removal of the water. Absolute alcohol is obtained as a residue, from which the whole of the third material used for the removal of the water has been separated. The overhead product is composed of all the benzol or other third material, of alcohol, and of all the water which was originally contained in the concentrated alcohol. The overhead product is subcooled after condensation to effect a sharper separation into two layers. The upper layer, containing very little water, is returned to the main column as reflux whereas the lower layer is introduced into another fractionating tower wherein there is effected.

(C) A fractional distillation of the lower layer for the purpose of separating the third material from diluted alcohol, which is withdrawn as a residue. The overhead comprising the third material flows back to the main column for dehydrating purposes, and the residue passes into a third distillation tower wherein there is accomplished.

(D) A rectification for concentrating the alcohol, which is obtained as an overhead product and which is added to the main charge of concentrated alcohol to be dehydrated. Alcohol-free water is withdrawn as a residue.

The process of dehydrating concentrated alcohol by azeotropic distillation can, therefore, be considered as consisting of two main distillation phases and one concentration step as follows:

1. Azeotropic distillation of a ternary blend of ethyl alcohol, water, and a third material used for the removal of water (for dehydration of the alcohol).

2. Distillation of a binary blend composed of ethyl alcohol and the third material used for the removal of the water for the elimination of the third material (to obtain absolute alcohol).

3. Separation of the overhead product from operations 1 and 2 to recover the alcohol and the third material and to eliminate from the system the water originally contained in the alcohol (to recover the third material and the accompanying alcohol).

The introduction of a third material for the removal of water by azeotropic distillation presents, naturally, economic and technical problems inasmuch as this operation causes certain losses which must be made up by the addition of more of the third material; on the other hand, the absolute alcohol must not be contaminated with the third material for many reasons.

The principal features of the present invention are to utilize as a third material for the removal of water from concentrated alcohol to be used for the preparation of a stable binary motor fuel the gasoline which will be a constituent of the stable motor fuel and to arrange the dehydrating equipment in such a manner that there is obtained directly as a final product the stable binary motor fuel desired. It is evident that this new method presents a simplification of the work required inasmuch as the separation of the third material used for the removal of the water is no longer necessary after the dehydration of the alcohol. The heat required for operating by this new method as compared with the known methods of producing absolute alcohol is naturally much reduced, and the conduct of the operations is simplified.

The equipment for the dehydration of a blend of concentrated alcohol and gasoline in accordance with my invention may be set up for continuous operation or for discontinuous or batch operation. In principal, the apparatus consists of a fractionating column having the necessary number of fractionating trays. Into the upper section of this column are introduced all of the concentrated alcohol to be dehydrated and all or part of the gasoline which is to be incorporated into the binary motor fuel. The column is also equipped for receiving reflux.

From this column there are withdrawn as a residual product a stabilized binary motor fuel free of water and as an overhead product the ternary azeotropic vapors. These vapors are subjected to complete condensation and to a separation into two distinct layers preferably under the influence of forced cooling or of a complementary action such, for example, as the addition of water to the heavy layer simultaneously or consecutively to the subcooling. The separation of the overhead condensate into two layeds produces a lighter, upper layer composed only of light gasoline and nearly completely dehydrated alcohol and a heavier, lower layer composed of substantially all the water, of alcohol, and of a little gasoline.

The lighter layer is separated and is returned to the main fractionating column as reflux. The heavier layer is subjected to complementary treatment to separate the water from the other materials which are returned to the main column. A classical method for treatment of the heavier layer is to fractionally distill it in two stages. In the first stage, gasoline is removed in vapor form; in the second stage, the residue of the first stage is separated into concentrated alcohol as an overhead product and water as a residue. The alcohol and gasoline so recovered are returned to the main column in either vapor or liquid form. It should be noted that the overhead gasoline vapors from the first stage may contain some alcohol.

This apparatus may also be used for the preparation of a stable binary motor fuel containing alcohol if the material to be incorporated is other than ethyl alcohol.

The diagrammatical flow sheet attached hereto gives details of a typical apparatus for continuous operation in accordance with the present invention.

The apparatus includes a main distillation column 10 fitted with the usual fractionating trays (not shown) or other means to assure an intimate contact between the ascending vapors and the descending liquid. A source of heat such as a steam reboiler coil 12 is positioned in a lower part of the column, and the desired product comprising the stable binary alcohol-gasoline motor fuel blend is drawn off through line 14 as by pump 15. Such blend of gasoline and anhydrous alcohol generally contains in the range of 10 to 25% alcohol. The outlet temperature of this product must be at least equal to the boiling point of the binary system of gasoline and alcohol in order to assure that all the water has been eliminated in vapor form towards the upper part of the column inasmuch as the ternary azeotrope of water, gasoline, and alcohol has a lower boiling point. To assure that the motor fuel blend is sufficiently subjected to reboiling heat, I may provide a weir or partition 16 to retain the liquid in contact with reboiling coil 12 for the desired length of time. Liquid level control 19 may be provided to control the withdrawal of the blended motor fuel through line 14. For control of the reboiling temperature, a control valve 18 for the admission of the heating steam is provided. The blended product is passed in heat exchange with the gasoline introduced through line 20 in a heat exchanger 21 and flows thereafter through a final cooler 22 before going to storage. The gasoline to be incorporated into the binary motor fuel is introduced through line 20 into the middle section of the column and is further heated after passage through exchanger 21 as by the steam preheater 24.

In the upper part of the column there takes place the azeotropic distillation of a ternary blend of gasoline, alcohol, and water from contact of the ascending vapors coming from the lower and middle parts of the column with the descending liquid composed of concentrated alcohol to be dehydrated introduced through line 25 and of the reflux liquids introduced through line 26. Alcohol admission control valves 27 and reflux admission control valves 28 may be provided. The azeotropic vapors formed of water, light gasoline, and alcohol flow through line 30 to condenser 32 wherein they are completely condensed. The resulting condensate is subcooled in cooler 34 in order to facilitate its separation into layers. The temperature at the top of the tower may be determined by a suitable pyrometer 35.

The overhead condensate enters separator 36, which is fitted with a baffle 38 to aid in separating the condensate into two layers of different gravity. The light layer flows through lines 40 and 26 to the main column 10 as reflux, but a part of it may be bypassed through line 41 and introduced into the lower part of the column in order to facilitate the control of the dehydrating operation. The heavy layer is pumped through line 42 as by pump 42a into a second subcooler 43 which is provided with artificial refrigeration to induce a further separation into layers. The additionally subcooled condensate then flows into a second separator 44 provided with baffle 44a wherein another separation into two layers takes place. The lighter layer separated in the second separator 44 flows through line 40a and may be used as reflux in the main column 10.

The heavier layer from the secondary separator 44 passes through line 45 into column 46, which may be heated by reboiler 48 and which effects a separation of the gasoline as the overhead removed through line 50 from the water and alcohol as the bottoms removed through line 52. Gasoline vapors may be suitably condensed as in condenser 54; part of the condensate may be used to reflux column 46 as at 55, and the remainder may be returned by the line 56 to the main column 10. According to the operating conditions selected, some alcohol and even some water vapors may also go overhead through line 50.

The water and alcohol mixture which leaves column 46 through line 52 is charged to column 60, which may also be heated by a suitable reboiler 62. In this column the alcohol is concentrated and is removed as the overhead through line 64; the water is removed as the bottoms through the line 66 and may be additionally cooled in cooler 67. The concentrated alcohol vapors are suitably condensed as by the condenser 68; some of the condensate from receiver 68a is used as reflux for column 60 and is returned through line 69, and the remaining condensate is pumped through line 70 by pump 71 to join the initial concentrated alcohol feed in line 25.

It may often be found desirable to supplement the subcooling and layer-forming effect produced in coolers 34 and 43 by adding water to the condensate from condenser 32 and to the lower layer from separator 36. The addition of such water aids considerably in the subsequent separation of the subcooled liquid mixtures into two layers. For this purpose I have found that the water withdrawn from the base of the alcohol concentrating column 60 as through line 73, which water has a low alcohol content, may be conveniently utilized; furthermore, a saving in steam cost is thereby effected inasmuch as such water need not be entirely stripped of its alcohol content. Such water may be added in controlled amount to the condensate from condenser 32 as through line 74 and to the lower layer from separator 36 as through line 75. If desired or found necessary, water from an external source may be introduced through line 76. Cooling coil 77 may be positioned in line 73 to provide any necessary cooling of the low alcohol content water removed from column 60. Pump 78 may be provided to permit return of the dilute alcohol solution to the separators 36 and 44.

Summarizing the operations in accordance with my invention, I feed to the column 10 in addition to gasoline a concentrated alcohol having approximately 4½–5% of water. In this column, the overhead comprises the ternary azeotrope of gasoline, water, and alcohol which may contain, for example, approximately 34% of alcohol, 62% of gasoline, and 4% of water. The bottoms comprises a water-free blend of alcohol and gasoline. By subcooling the ternary azeotrope condensate, I am able to remove a lower layer which contains little gasoline and an upper layer which is rich in gasoline and which can be returned as reflux to the main column 10.

The lower layer removed through line 45 is fractionated in column 46 to remove the retained gasoline, which is returned to the main column 10; a water-alcohol mixture is removed as the bottoms. This water-alcohol mixture can be concentrated in the final column 60 with the water removed from the system through line 66.

In the condensing and subcooling of the overhead from distillation column 10, I find that it is most convenient and economical to subcool the condensate from condenser 32 in cooler 34 to about 65–75° F. inasmuch as this result can be accomplished with the average cooling water. In the artificially refrigerated cooler 43, the temperature of the lower layer removed from separator 36 is most economically reduced to about 30–40° F. These temperature reduction stages give especially good results in the recovery of the gasoline and alcohol from the overhead from column 10. It will also be appreciated that the water may be added to the condensate either simultaneously or consecutively to the subcooling thereof.

My process may be operated at atmospheric or at super-atmospheric pressures which may range as high as 100 lbs./sq. in. or more. At the higher pressures better results can be obtained inasmuch as less gasoline is removed in the overhead vapors from column 10; and, hence, more gasoline is directly incorporated into the ultimate motor fuel blend. When operated at superatmospheric pressure, it is preferable to have the column 46 at a pressure slightly higher than the pressure in column 10 so that the overhead vapors may return as such to column 10 through line 56. Suitable means may be provided to separate out the necessary reflux for column 46 as is well known, and the customary pressure and relief valves may also be provided. Preferably column 60 is normally operated at atmospheric pressure.

Although I have described my improved distillation procedure in connection with the formation of an alcohol-gasoline blend, certain features thereof are applicable to the dehydration of concentrated alcohol for the production of absolute alcohol. For example, column 10 may be used for the production of absolute alcohol, which may be removed through bottoms line 14; and columns 46 and 60 may be used for the recovery of the alcohol and the third material utilized to remove the water contained in the overhead vapors from column 10. In such case, low alcohol content water may be conveniently and economically withdrawn from the base of column 60 as through line 73 and added to the condensate from condenser 32 and to the lower layer from separator 36 to aid in the desired layer formation. It will be appreciated that, in either operation, the third material such as gasoline is desirably substantially immiscible with water.

I have thus provided an improved process to remove continuously the water initially contained in the concentrated alcohol and to obtain a water-free motor fuel blend of gasoline and alcohol. Although I have described a preferred embodiment of my invention, modifications may exist thereto; accordingly, only such limitations as appear in the claims appended hereinafter should be made.

I claim:
1. The method of producing a stable motor fuel blend consisting of ethyl alcohol and gasoline from a mixture of concentrated aqueous alcohol and gasoline, which comprises distilling said concentrated alcohol and gasoline in a distillation zone to form a ternary azeotrope of alcohol, gasoline, and water as overhead, condensing said azeotrope, subcooling the resulting condensate to obtain upper and lower layers of liquids, the upper layer of which comprises substantially anhydrous alcohol and gasoline, using said upper layer as reflux for said distillation zone, removing a stable substantially anhydrous gasoline-alcohol motor fuel as a bottoms product from said distillation zone, preliminarily separating any gasoline contained in said lower layer in a second distillation zone in the overhead therefrom, fractionally separating said gasoline-free lower layer in a third distillation zone to recover concentrated alcohol as the overhead therefrom, recirculating said concentrated alcohol to said first distillation zone, withdrawing substantially alcohol-free water as the bottoms from said third distillation zone, removing low alcohol content water from a point near the bottom of said third distillation zone, and adding said low alcohol content water to the overhead condensate from said first distillation zone to facilitate separation of said condensate into the layers of liquids.

2. The process of dehydrating a concentrated aqueous alcohol solution by azeotropic distillation, which comprises introducing said concentrated alcohol and a third material into a distillation zone, said third material forming an azeotrope with the alcohol and water and being substantially immiscible with water, distilling said concentrated alcohol and said third material to form a ternary azeotrope of alcohol, the third material, and water as overhead, condensing said azeotrope, subcooling the resulting condensate to obtain upper and lower layers of liquids, the upper layer of which comprises substantially anhydrous alcohol and the third material, using said upper layer as reflux for said distillation zone, removing substantially anhydrous alcohol free of said third material as a bottoms product from said distillation zone, preliminarily separating any of the third material contained in said lower layer in a second distillation zone in the overhead therefrom, fractionally separating said third material-free lower layer in a third distillation zone to recover concentrated alcohol as the overhead therefrom, recirculating said concentrated alcohol to said first distillation zone, withdrawing substantially alcohol-free water as the bottoms from said third distillation zone, removing low alcohol content water from a point near the bottom of said third distillation zone, and adding said low alcohol content water to the overhead condensate from said first distillation zone to facilitate separation of said condensate into the layers of liquids.

3. The method as claimed in claim 1 which includes further subcooling the lower condensate layer to form a second set of upper and lower layers, the upper of which comprises a further quantity of substantially anhydrous alcohol and gasoline, utilizing the second upper layer as additional reflux for the first distillation zone, fractionally separating the second lower layer, after removal in the second distillation zone of any gasoline contained therein, in the third distillation zone to recover concentrated alcohol as the overhead therefrom, and adding low alcohol content water to the lower condensate layer to facilitate separation thereof into layers.

4. The method as claimed in claim 2 which includes further subcooling the lower condensate layer to form a second set of upper and lower layers, the upper of which comprises a further quantity of substantially anhydrous alcohol and the third material, utilizing the second upper layer as additional reflux for the first distillation zone, fractionally separating the second lower layer, after removal in the second distillation zone of any of the third material contained therein, in the third distillation zone to recover concentrated alcohol as the overhead therefrom, and adding low alcohol content water to the lower condensate layer to facilitate separation thereof into layers.

ALFRED S. WOLFNER.